Nov. 14, 1961 — E. A. ROCKWELL — 3,008,547
MECHANICAL BOOSTER BRAKE
Filed May 21, 1956 — 5 Sheets-Sheet 4

Inventor
EDWARD A. ROCKWELL
by: Carlson, Pitzner, Hubbard & Wolfe
Attys.

Inventor
EDWARD A. ROCKWELL
by: Carlson, Pitzner, Hubbard and Wolfe
attys.

United States Patent Office 3,008,547
Patented Nov. 14, 1961

3,008,547
MECHANICAL BOOSTER BRAKE
Edward A. Rockwell, 167 Ashdale Place,
Los Angeles 49, Calif.
Filed May 21, 1956, Ser. No. 586,188
13 Claims. (Cl. 188—72)

The present invention relates to improvements in brakes and particularly to brakes of the disc type suitable for automobiles, trucks, buses, etc., and airplane landing wheels operable by a direct mechanical or hydraulic connection between the treadle and the brake mechanisms.

It is the primary object of the present invention to provide a brake having a novel booster mechanism which enables direct brake control with only a light treadle pressure operating over a short distance but which avoids the disadvantages normally associated with "self-energized" brakes. It is another object to provide a novel booster brake which may be operated directly by foot pressure without use of auxiliary power mechanisms of the vacuum or hydraulic type but which nevertheless exhibits the light pressures and ease of braking characteristic of braking systems employing such auxiliary power mechanisms.

It is an object of the invention in a broader aspect to provide an improved power actuating mechanism which will derive energy from a rotating member and convert the same to energy applied in a linear direction, the energy being applied or discontinued in instantaneous response to the application or removal of a relatively small controlling force.

More specifically, it is an object to provide a mechanical booster brake having a high booster ratio but which is fully responsive to treadle control and in which there is no tendency toward "grabbing," with release occurring instantaneously, under all conduitions, upon release of the treadle. It is another object to provide a brake which will "fight a skid" and in which there is little likelihood of a skid except by application of unusual treadle pressure. Consequently, it is an object to provide a brake which tends to insure against loss of steering control under hazardous road conditions.

It is a related object to provide a brake of the above type which is consistent and reliable in operation over the wide range of conditions at the braking surfaces which may be encountered in use such as the presence of water, grease, or other foreign matter, and the existence of high local temperatures. In this connection, it is an object to provide a brake which will not "fade" with repeated severe usage.

It is a general object to provide a brake which offers a maximum safety and which places no reliance upon auxiliary power mechanisms. It is a correlative object to provide a mechanical booster brake in which all but a small fraction of the braking force is derived from the momentum of the vehicle over a wide range of vehicle speed, and which requires only a slight roll of the vehicle for full effectiveness.

It is a further object of the invention to provide a booster brake in which the control forces are low, thus obviating deflection or distortion of the control members and promoting precise control and in which the actual braking forces are moderate and confined to mechanism directly associated with the brake discs. It is a more detailed object to provide a novel mechanism in which the actual braking forces are borne by cylindrical cage members which are inherently strong and in which the forces are so distributed as to enable efficient use of material.

It is, moreover, an object related to the above to provide an improved arrangement in which axial braking forces are automatically balanced or self-cancelled and in which no axial braking force is transmitted to the wheel hub.

It is another object of the present invention to provide a mechanical booster brake which is extremely compact and which is capable of being mounted in the hub portion of the small (fourteen inch) wheels used on modern motor cars. It is a related object to provide a novel brake mechanism which is constructed to occupy a small annular space totally enclosed within the wheel but which nevertheless provides for efficient cooling of the brake surfaces. In this connection it is an object to provide a cooling arrangement in which cooling vanes are employed in a novel tandem arrangement to provide forced displacement of cooling air over a wide range of vehicle speed and in which the air is directed through passages provided in the hub and brake disc structures.

It is moreover an object of the invention to provide a disc brake structure having provision for handling large volumes of cooling air but in which the braking surfaces as well as the control and linkage mechanisms are shielded against the entry of dirt or other foreign material which may be carried by the air stream with the air being directed along a predetermined path. In this regard it is an object to draw in the cooling air from the "rear" or vehicle side of the brake structure so that the intake openings are shielded from water, mud or other foreign matter that may be splashed or thrown by passing vehicles.

Finally, it is an object to provide a mechanical booster brake which, in spite of its compactness, may be easily and quickly disassembled but in which the necessity for disassembly and maintenance is reduced to a minimum. It is an object to provide a booster brake which exhibits minimum wear but in which convenient external means is provided for both initial adjustment of the brake surfaces and for any take-up which may be necessary during the course of use.

Other objects and advantages of the invention will become apparent upon reading the attached detailed description and upon reference to the drawings in which.

While the invention will be described in connection with a preferred embodiment, it will be understood that I do not intend to limit the invention to that embodiment, but, on the contrary intend to cover such alternative embodiments and constructions as may be included within the spirit and scope of the appended claims.

Turning now to the drawings, a brake embodying the present invention has been shown applied to the front wheel of an automobile. The front wheel spindle indicated at 10 is integral with a spindle support 11 which is adapted for mounting on the automobile steering spindle in the usual way. Surrounding 10 is a hub indicated generally at 12 mounted on suitable anti-friction bearings, 13, 14. The face 15 of the hub is substantially flat and is provided with a locating boss 16 for centered mounting of a wheel 17. The latter is rather deeply cup-shaped of drawn construction, and has a wall 18 on which a rim 20 is secured. The wheel 17 is secured to the hub by a circle of nuts 19.

It may be noted at this point that the rim 20 has a main drop-center portion 21 and a second drop-center portion 22 providing internal annular ridges which flatly engage spaced regions on the wall 18 of the wheel. The wheel and rim are secured together by electrical weldments spaced circumferentially. Preferably these weldments are alternate or interspaced with one another in order to provide a zig-zag pattern of points of connection providing a high degree of strength. Preferably also the intermediate portions of the wall 18 and the rim 20 are spaced apart to form an annular space 23 which imparts box-like rigidity to the structure.

The wheel structure described above provides a deep receptacle of annular shape totally contained within the confines of the wheel rim. As the discussion proceeds it will be seen that the brake mechanism is not only constructed to provide maximum braking efficiency, but also to provide a compact nested construction which efficiently utilizes the available space.

Telescoped within the rim is a stationary brake housing 30 which is cylindrically shaped having a base 31 and an outer end portion 32, the purpose of the housing 30 being to absorb the reactive force which is developed at the brake surfaces. For mounting the housing with respect to the spindle body 11 a frame or backing plate 40 is provided which may be of pressed metal, having an annular center portion and provided with three outwardly extending arms 41, 42, 43, respectively. The frame is securely clamped to a flat annular surface 44 provided on the spindle body by means of nuts 45 which engage suitable studs permanently secured in the body 11. In order to provide a maximum amount of strength and rigidity, each of the arms 41–43 is pressed into channeled cross section as indicated at 41a–43a respectively. The base portion 31 of the housing which is preferably a casting of aluminum alloy, is reinforced at three places by integral enlargements 51–53 respectively. Anchored in each of these enlargements are axially extending studs 54, 55 arranged to project through suitable openings provided at the ends of the arms 41–43 respectively on the frame.

In order to strengthen and rigidify the housing 30, it is provided with integral axially arranged ribs 60 extending from the region of the fastening studs 54, 55. In addition the housing is formed with parallel ribs 61 spaced about its periphery as shown. Between the ribs 61 large openings 62, 63 are provided for passage of cooling air as is later discussed. The resulting structure is cage-like and of high inherent rigidity, and can be easily die cast and finished with a minimum amount of machining.

Turning attention next to the hub 12, it is provided with an annular flange 69 terminating in a collar 70 which carries a primary brake disc 71 and a secondary brake disc 72 axially spaced from one another. These brake discs are rotationally secured to the hub 12 but provision is made for slight axial movement relative thereto, the purpose of which will be later explained. Specifically, the disc 71 is mounted on the hub collar 70 by a splined connection 73 and the disc 72 is mounted on the hub collar by means of a splined connection 74. Both of these discs thus rotate with the wheel of the automobile and braking is accomplished by applying frictional forces to the opposite faces of each of the discs. By means of the mechanism to be described braking forces are applied manually to the primary brake disc 71 to produce initial braking of the vehicle. The reactive forces developed at the faces of the primary brake disc are then employed through a reversible force multiplying arrangement to apply braking force to the opposite faces of the secondary brake disc.

Attention may first be given to the means cooperating with the primary brake disc 71 to produce the initial braking action. A pair of primary friction members are provided in the form of a flange 81 on the left hand side (FIG. 8) and a presser plate 82 on the right hand side bearing against disc surfaces 71a, 71b respectively. The flange 81 is formed integrally with a thrust applying member 80 of cylindrical shape telescoped within the housing 30. The friction members 81, 82 respectively, are provided with brake linings 83, 84 securely cemented thereto. The presser plate 82 is of annular shape and is telescoped within the thrust applying member 80, being coupled thereto by a splined connection 85.

In accordance with the present invention the primary friction members, i.e. the members 81, 82, are mounted for limited "retarding" movement in a peripheral direction and means are provided thereon for producing inward squeezing movement of the primary friction members relative to one another so that they pinch the brake disc 71 between them. In the present instance this relative movement is brought about by means of a set of levers spaced at equal intervals about the periphery of the primary friction members and means are further provided for operating all of the levers simultaneously and to an equal degree independently of the movement, either axially or peripherally, of the primary friction members. In the illustrated embodiment three levers are employed which have been designated 91–93 inclusive. The lever 91 will be taken as representative. It is pivoted to the presser plate 82 on a clevis pin 91a, the clevis pin being located off-center to define a short force applying arm 91b and an input arm 91c. Engagement between the short arm and the thrust applying member 80 is obtained by means of a snap ring 94 which is fitted in a suitable groove machined on the inner wall of the thrust applying member. It will be apparent that when the levers 91–93 are rocked in a force applying direction (clockwise in FIG. 8), the thrust applying member will be moved to the right and the primary presser plate 82 will be moved to the left to exert inward squeezing movement on both sides of the brake disc 71.

For the purpose of rotating the levers 91–93 by means of manual effort while permitting bodily movement thereof, an annular piston and cylinder arrangement is provided which is concentrically arranged with respect to the wheel spindle. In the present instance the annular cylinder indicated at 100 has walls 101 and 102 defining an annular space between them for the admission of hydraulic fluid. Within the cylinder 100 is an annular piston 105 presenting annular, axially-facing wear surface 106. A resilient O ring 107 is provided within the cylinder in order to seal the assembly against the escape of hydraulic fluid. For the purpose of conducting fluid to the cylinder 100, a coupling 108 is provided which extends through an opening formed in the arm 41 and is threaded for connection to an hydraulic line. A bleed connection 110, which also extends through an opening in the arm 41, is used for bleeding air from within the cylinder, both initially and as may be required from time to time.

Since the surface 106 of the axially-facing piston is smoothly continuous, it will be apparent that the piston will be effective to operate all of the levers 91–93 simultaneously and to an equal degree in spite of the limited bodily movement of the levers which occurs during braking. In order to reduce the friction between the inner ends of the levers and the wear surface 106, such levers are provided with anti-friction rollers 91d–93d, the roller 91d being shown by way of example in FIG. 8.

Further in accordance with the present invention a novel arrangement is provided for applying an endwise braking thrust against the secondary brake disc in response to the drag exerted upon the members (81, 82) contacting the primary brake disc. In the present instance this is accomplished by constraining the thrust applying member 81 to move along a helical path to produce an axial component of movement which is utilized to produce the secondary braking action.

Prior to describing the mechanical elements which produce the axial thrust, more detailed attention may be given to the friction members which bear against the secondary brake disc 7. As in the case of the primary brake disc 71, the brake disc 72 is provided with annular braking surfaces on its opposite faces as indicated at 72a and 72b respectively. For contacting the surface 72a, the outer end of the stationary housing 30 is extended radially inward to provide an overlying flange which may be identified as secondary friction member 115. On the opposite side of the brake disc 72 an annular presser plate 116 is provided which constitutes another secondary friction member. The friction members are provided with brake linings 117, 118 respectively which are fastened thereto by cementing or the like. In order to prevent relative rotation of the presser plate 116 and for transmitting the reactive torque to the stationary housing 30, a splined connection 119 is provided between the members. It will be apparent that when the presser plate 116 is urged to the left as viewed in FIG. 8, the brake disc 72 will be squeezed or pinched between the opposed friction surfaces, with the reaction force being mounted directly to the stationary housing 30 and from the housing to the frame 40.

Figure 7:
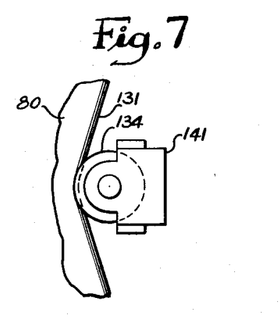
FIG. 7 is a top view of a portion of the FIG. 6 structure.

In order to understand the means used to convert peripheral retarding movement of the cylindrical thrust member 80 into axial thrust, reference is made to FIG. 7. Here will be noted that the edge of the member 80 which faces toward the frame 40 carries a set of circumferential cam surfaces 131—133 respectively which are symmetrically located with respect to one another. Engaging the respective cam surfaces 131—133 is a set of rollers 134—136. These rollers are mounted in roller brackets 141—143 respectively, which are secured to the outer ends of the arms 41–43 of the frame.

The cam surfaces 131—133 are preferably in the form of shallow V notches having a slope which may vary, for example, from 1:3 to 1:10 depending upon the boost ratio which is desired. In order to retract the thrust member 80, and to restore the other mechanical elements to an "at rest" position when the bracket is idle or de-energized, retraction springs 144—146 are provided in the form of short coil springs spaced at equal intervals about the periphery, one end of each of the springs being hooked on to the primary presser plate 82 and the other end being anchored to the frame 40. More specifically, the movable ends of the springs may be secured to lugs 151—153 on the primary presser plate while the remaining ends are secured to lugs 154—156 on the frame 40. The spring force acting through the levers 91–93 thus causes the thrust applying member 81 to be biased against the rollers 134—136 so that the rollers are normally bottomed at the roots of the respective cam surfaces just as shown in FIG. 7. Preferably, the springs are so arranged as to occupy an axial position when the rollers are bottomed in the cams. Consequently any peripheral movement of the thrust applying member 80 and primary presser plate 82 produces a peripheral component of spring force as well as an axial component tending to urge the member 80 into its bottomed or centered position. It may be noted, in addition, that the spring force produces a reactive torque at arms 91c–93c of the operating levers, so that such levers are kept firmly seated at all times on the wear surface of the piston 105.

In order to insure that the operation of the cam surfaces 131—133 is reversible, i.e. to insure that the thrust applying member returns promptly to its idle position when the braking force on the primary disc is released, anti-friction bearings are provided at each end of the thrust applying member. At the right-hand end the cam rollers 134—136 are provided with anti-friction spindle bearings in the form of rollers or balls as indicated in 134a and 136a, respectively. At the left hand or operating end of the thrust applying member a series of roller bearings 160 are used arranged in an annular retainer 161. These roller bearings are interposed between the thrust applying member 80 and the secondary presser plate 116 and are symmetrically arranged so that the thrust is evenly distributed about the periphery of the presser plate. The roller bearings may, if desired, be employed in groups spaced at equal intervals. Freedom from cocking or binding of the thrust applying member is assured by guiding the same at each end. This is accomplished at the left hand end (FIG. 6) by forming an upraised annular bead 162 on the thrust applying member and by dimensioning the interior surface of the housing 30 to provide a free, sliding fit. In order to maintain the opposite edge of the thrust applying member centered with respect to the axis of the brake, the cam rollers 134—136 are preferably formed with a round-bottomed groove mating with correspondingly rounded contour of the cam surfaces 131—133. The two regions of support are thus spaced apart axially by a substantial amount. Friction incident to movement of the thrust member 80 is further reduced by using anti-friction bearings to mount the rollers 91d–93d on the ends of the levers 91–93.

In the construction described above and in accordance with one of the aspects of the invention, it is to be noted that the discs 71, 72 are free to float axially in the hub on the spline connections 73, 74. This is accompanied by a number of important advantages. Most important is the fact that the braking action at the primary disc 71 is substantially affected by movement of the thrust applying member 80 as the latter is cammed to the left. This is clearly seen by considering the following: Since the levers 91–93 are bodily mounted or fulcrumed on the primary presser plate 82 with one end of each of them bearing against the thrust applying member 80, the levers are free floating. Thus, when the thrust member is cammed to the left, the presser plate is, by reason of the reaction force existing at the lever fulcrums, also cammed to the left. Consequently both of the primary friction members 81, 82 are moved together bodily to the left without interrupting or substantially affecting the primary braking force which is exerted by foot pressure. Significantly, the brake disc 71 is free to move axially to maintain a constant centered position between the primary friction members.

Focusing attention on the secondary brake disc 72, the freedom to move axially is important since one of the secondary friction members which engage it is stationary. The axial floating movement insures that the disc will maintain a centered position with respect to both its secondary friction members over the center braking range. In the case of both of the discs 71 and 72 both braking surfaces thereon are equally braked at all times insuring that any wear takes place equally on the associated brake linings. In short, all forces normal to the discs are automatically balanced and thus self-cancelling. Furthermore, as is inherent in any free sliding, spline connection, no axial braking force can possibly be transmitted to the vehicle hub, thus insuring minimum loading on the wheel bearings.

Figure 1:
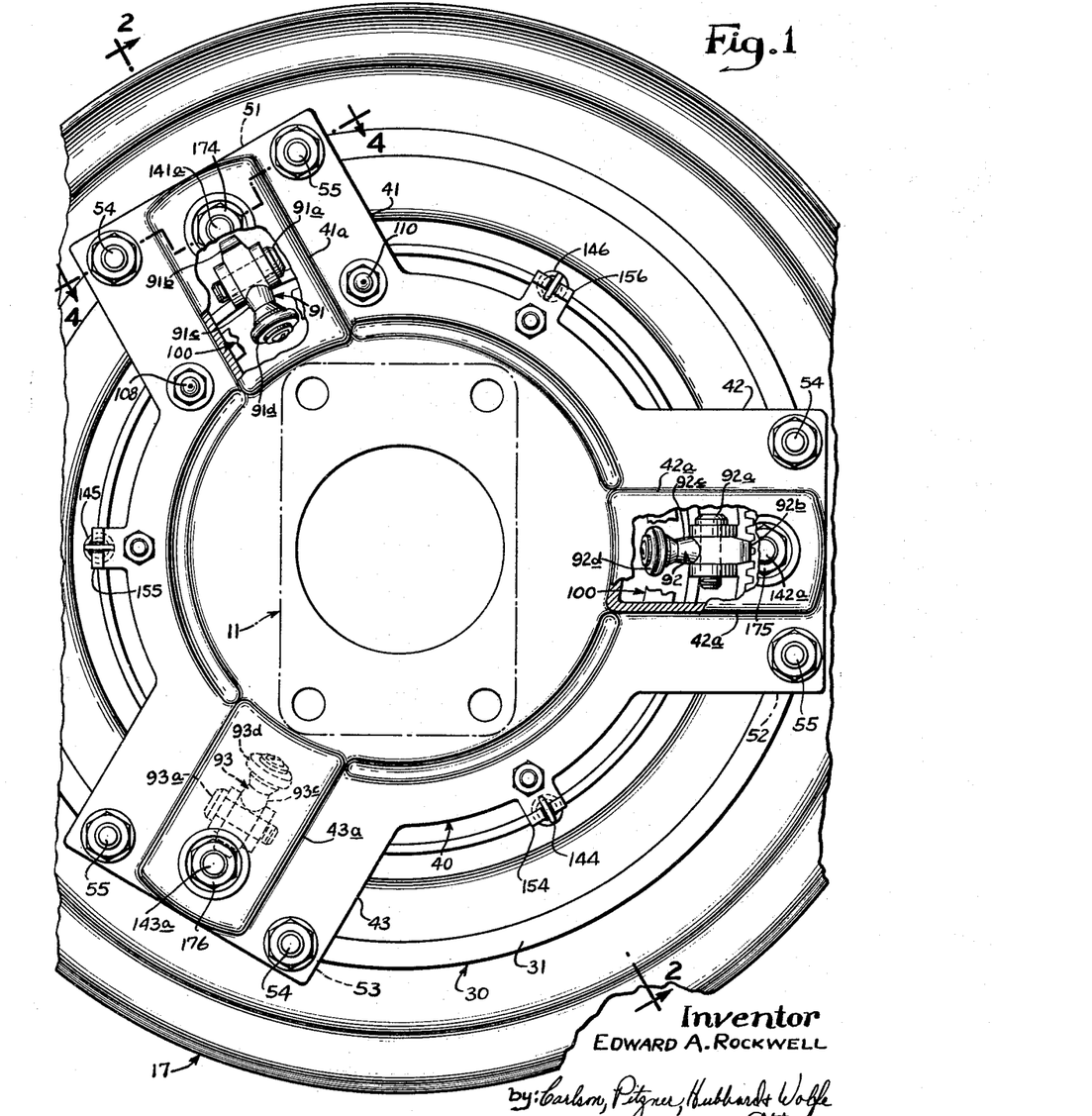
FIGURE 1 is a partial side view of an automotive wheel having the booster brake installed therein taken from the side of the wheel facing the vehicle, with a portion of the covering structure broken away.
Figure 2:
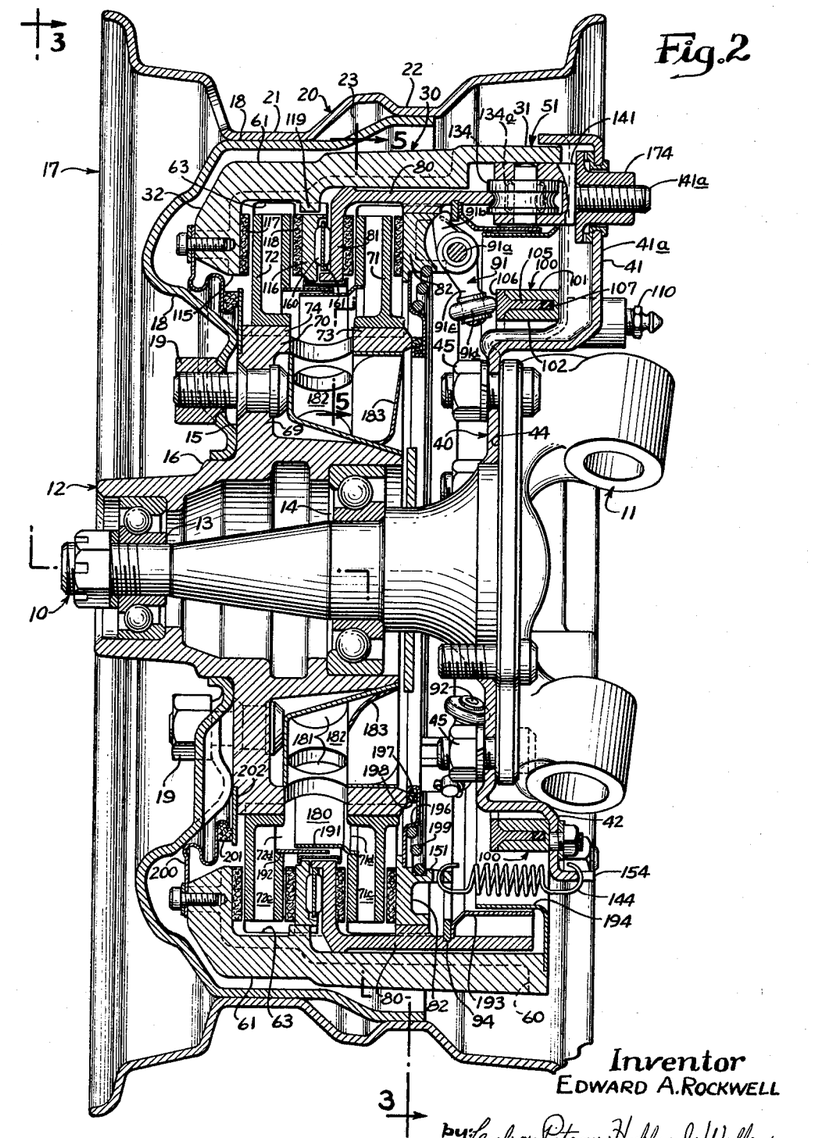
FIG. 2 is a section view taken along line 2—2 in FIG. 1.
Figure 6:
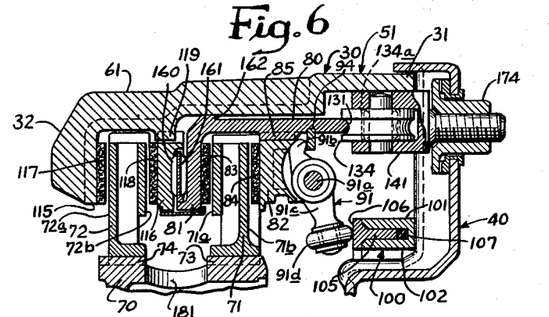
FIG. 6 is a simplified view of a portion of the structure shown in FIG. 2 when in one position.
Figure 8:
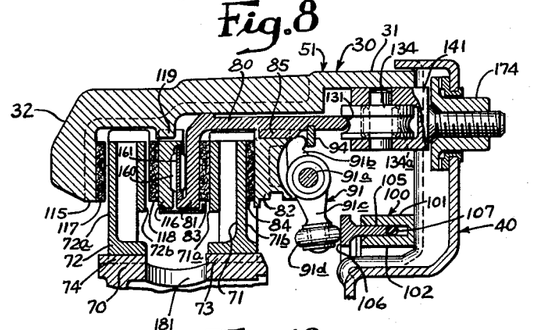
FIG. 8 is as FIG. 6 when the structure is in a second position.
Figure 9:
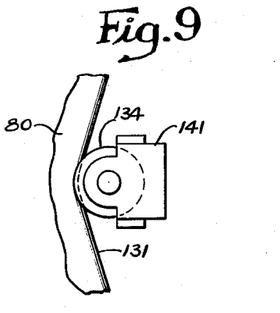
FIG. 9 is a top view of a portion of the FIG. 8 structure.

Prior to discussing the further details of construction it will be helpful at this point to briefly summarize the operation of the braking elements in a typical operating sequence as set forth in FIGS. 6–11 inclusive. The initial or idle condition is shown in FIGS. 6 and 7 where it will be noted that clearance exists between the brake discs and the associated friction members. Applying pressure to the brake treadle on the vehicle causes the hydraulic brake line connected to the inlet 108 to be pressurized. As shown in FIGS. 8 and 9, this pressure causes axial movement of the piston 105 in the cylinder 102 causing the piston to move to the left bringing pressure simultaneously to bear on the operating arms 91c–93c of the levers 91–93. Each lever thus exerts a prying action with the primary presser plate 82 being urged to the left and the primary friction member being urged to the right into contact with the primary brake disc 71. Thus the primary brake disc is squeezed or pinched between the primary friction surfaces to apply braking torque to the brake disc 71. The force exerted on both sides of the primary brake disc is equalized, as previously mentioned, by the action of the splined connection 73, enabling the disc 71 to seek a centered position so as to balance the forces acting upon it. In FIGS. 8 and 9 the manual pressure exerted through piston 105 which urges thrust member 80 to the left is just balanced by the force of the reaction springs 144—146 (FIG. 2).

Figure 10:
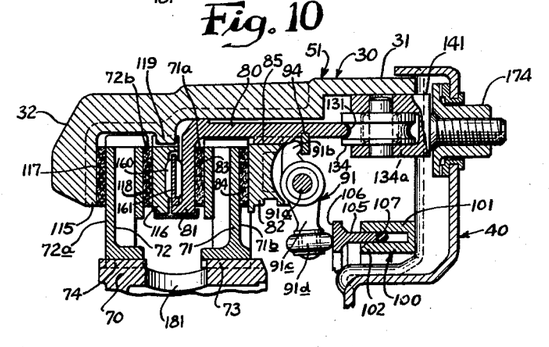
FIG. 10 is as FIG. 8 when the structure is in a third position.
Figure 11:
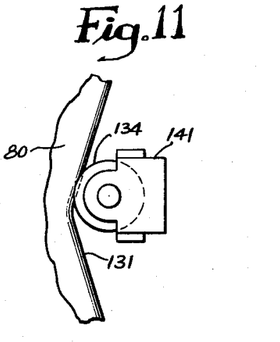
FIG. 11 is a top view of a portion of the FIG. 10 structure.

The resulting reaction or drag upon the relatively stationary friction members causes the thrust applying member 80 to tend to move peripherally. This causes the cam surfaces 131—133 to ride up on the rollers 134—136, respectively, as shown in FIGS. 10 and 11, constraining the member 80 to move along a helical path. The axial component of such movement, acting through the member 81, causes pressure to be brought to bear against the roller thrust bearing 160 which in turn applies axial thrust against the secondary presser plate 116. The secondary brake disc is thereby squeezed or pinched between the secondary friction surfaces 117, 118 so that braking force is applied to the secondary brake disc 72, the latter tending to seek a centered position relative to the friction surfaces by reason of the splined connection 74.

Since the slope of the cam surfaces 131—133 is relatively shallow, the dragging force at the primary brake disc is effectively multiplied so that a large and proportional force is exerted against the secondary brake disc. The net result is that most of the braking is accomplished by the secondary brake disc.

In the above sequence the movements have for simplicity of unerstanding been broken down into two steps. Actually a smooth transition occurs between the idle state shown in FIGS. 6 and 7 and the final braking condition illustrated in FIGS. 10 and 11, with the entire system being constantly in a state of equilibrium.

Upon release of the braking force upon the control treadle on the vehicle, the piston 105 moves inwardly accompanied by rotation of the levers 91–93. This releases the prying forces, and the reaction springs 144—146 are effective immediately to disengage the pressure plate 82 from the primary brake disc. This removes the force of peripheral drag from the thrust applying member 80 so that such member is free to return to its bottomed or right hand position with respect to the rollers 134—136. Movement of the thrust member 80 to its bottomed position is accompanied by release of the axial braking force at the secondary brake disc so that no further braking occurs, at the secondary brake disc, the system thus being restored to the idle condition shown in FIG. 6.

The above summary of the operation of the brake has presupposed that the vehicle is in motion, the normal situation where it is desired to actuate a brake, and that therefore the camming action discussed above would be available to apply braking pressure to the secondary brake disc. However, it is also often desirable to actuate a vehicle's brakes when it is statoinary, for example, when it is poised on a hill.

It is therefore significant to note that in the present device a braking force can be exerted on each of the brake discs 71 and 72 by direct manual pressure when the vehicle is not in motion. As explained above, piston 105 is actuated by the brake operator through a hydraulic line to pivot levers 91–93 which in turn pry primary presser plate 82 and primary friction member 81 into engagement with primary brake disc 71. When the vehicle is not in motion there is no resulting peripheral force exerted on the thrust applying member 80 as discussed above, but the levers 91–93, plate 82, disc 71 and member 81 are all clamped rigidly together under the urging of piston 105. Continued force exerted by piston 105 will move this entire rigid assembly to the left (FIG. 8) and member 81, acting through thrust bearing 160, will urge secondary presser plate 116 to the left to squeeze or pinch the secondary brake disc 72 between brake surfaces 117, 118. Thus a braking force is effectively applied to each brake disc even when the vehicle upon which the brake is mounted is not in motion.

It is important to note that while a force will be applied to the secondary brake disc 72 that is equal to the manual force exerted through the piston 105, a greater force is applied to the primary brake disc 71 by the utilization of the levers 91–93. Taking the lever 91, for example, it can be seen that the input arm 91c is longer than the force applying arm 91b and therefore the force exerted by this lever against brake disc 71 is proportionately greater than the manually induced force through piston 105. It will be appreciated that in normal operation the secondary brake disc 72, and the friction surfaces co-operating with it, do most of the work, due to the booster action of the brake. However, by selecting a force multiplying ratio for the input and force applying arms of the levers 91–93 it is possible to apply greater pressure on brake disc 71 and thus relieve disc 72 of part of its work load. This results in a longer life for the friction members co-operating with the brake disc 72.

It is to be noted that the levers 91–93 act in a novel fashion in producing the forces exerted upon the braking elements. Thus, to the extent that the lever 91, acting upon the snap ring 94, produces relative movement of member 80 to the right (FIG. 2), such lever is a lever of the first class. To the extent that such lever causes relative movement of the friction member 82 to the left, such lever is a lever of the second class. In actual operation, both relative movements occur simultaneously and consequently the lever partakes of the function of both classes.

Prior to further discussion of the features and advantages of the present brake, more detailed attention may be given to the adjusting and cooling means.

First of all, with regard to adjustment, it is one of the features of the present device that the adjustment of take-up in order to compensate for wear at the brake surfaces may be accomplished easily and quickly by means which are readily accessible. In accordance with one of the more detailed aspects of the invention the roller brackets 141—143 are mounted for endwise movement in way openings 171—173 formed in the housing 30 and a threaded adjustment, accessible outside of the frame, is provided between the roller brackets and the points of anchoring to the frame. More specifically each of the roller brackets has a threaded stud 141a—143a, respectively, engaged by nuts 174—176. These nuts are axially captive in openings provided in the arms 41–43 of the frame. A rotational detent is provided for each nut to serve as a measure of the amount which the nut has been turned.

Such a detent may, for example, take the form of a disc 148 on each of the nuts 174—176, and a ferrule 149, secured to the frame arms 41–43, against which the discs are urged by the retraction springs 144—146. The discs 148 carry two spaced projections which co-operate with a series of uniformly spaced depressions formed in the ferrules 149 to produce the detent action. Each ferrule may be secured at the same angular relationship with respect to the frame so that the thrust applying member 80 can be accurately and evenly adjusted by turning each of the nuts 174—176 any predetermined number of revolutions or fractions thereof as evidenced by the "clicks" felt by the operator.

For the purpose of providing a take-up adjustment for the friction members 81, 82 associated with the disc 71, means are provided for adjustably determining the normal or starting position of the levers 91–93. In the preferred form of my invention I employ means for mounting the annular hydraulic cylinder 100 adjustably with respect to the frame 40, as set forth in FIG. 13. The cylinder 100 is mounted on threaded studs 205, preferably three in number and spaced at equal intervals about the periphery. Threaded on the studs are nuts 206 held captive within openings in the frame 40 to hold the cylinder in a position spaced relative to the frame. Each nut has a disc which co-operates with a fixed ferrule 207 to provide a rotational detent just as in the case of discs 148 and ferrules 149 discussed above. Where this take-up means is provided, it will be understood that the connections 108, 110 for bleeding and pressurizing are slidable relative to the frame. In practice each of the nuts is turned so as to "bottom" the friction members on the disc 71, using the same force as indicated by a torque wrench or the like. Each nut is then backed off a predetermined number of "clicks" of the detent.

It should be noted that the adjustments described above permit the precise spacing of the four alined brake linings by making it possible to move the middle two independently of the outside ones. Thus, by turning nuts 174 the spacing between linings 117 and 118 can be accurately set. Then, nuts 206 can be turned to accurately space the linings 83 and 84. It is, therefore, possible to easily control the initial spacing of the linings from each of the brake discs and to compensate for wear at each disc even though more wear occurs at one disc than the other.

Figures 3, 12:
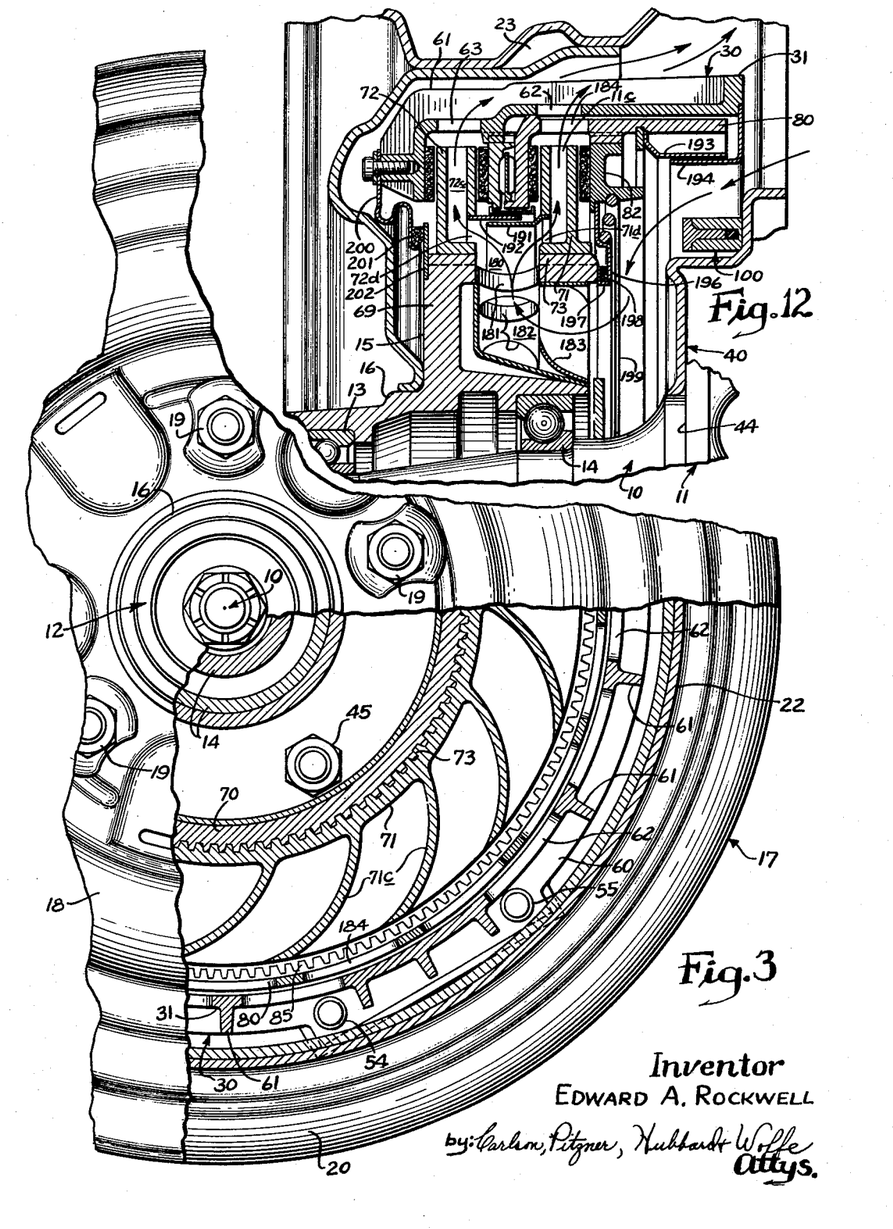
FIG. 3 is a partial side view, in partial section, taken along line 3—3 in FIG. 2.
FIG. 12 is a section view similar to the upper half of FIG. 3, the structure being somewhat simplified.

Turning next to the means for cooling the primary and secondary brake disc shown best in FIG. 12 it will be noted that each of the discs is of channeled hollow construction to provide a series of internal cooling vanes which draw air from a region near the hub and discharge it at the disc periphery. Taking the primary brake disc 71 by way of example, it includes a set of vanes 71c which are preferably curved to produce the most efficient pumping of air over the normal range of vehicle speed. All of the vanes 71c are supplied with air from an annular opening 71d formed adjacent the hub. Similarly, the secondary brake disc 72 is formed with a series of internal cooling vanes 72c which are supplied from an annular opening 72d adjacent the hub.

In accordance with one of the aspects of the invention the air inlet openings 71d, 72d face inwardly toward a central chamber to which air is supplied under pressure. Air is admitted to the region 180 by means of spaced openings 181 provided in the collar of the hub and between the discs. The hub, moreover, is formed with a deep axially facing annular recess or chamber 182. At In order to simplify construction of the hub, the vane 183. Rotation of the hub causes the vanes 183 to force air into the chamber 182, from which it is discharged through the passages 181 and into the space 180. The vanes thus act, in effect, as a supercharger to supply pressurized air to the inlet openings 71d, 72d, of the discs.

In order to simplify construction of the hub, the vanes assembly 183 may be separately formed and pressed into the position shown. The arrangement described above not only assures flow of adequate cooling air, but enables the hub passages 181 to be sufficiently small so that the strength of the hub and particularly the collar portion thereof is not impaired.

Figure 4:
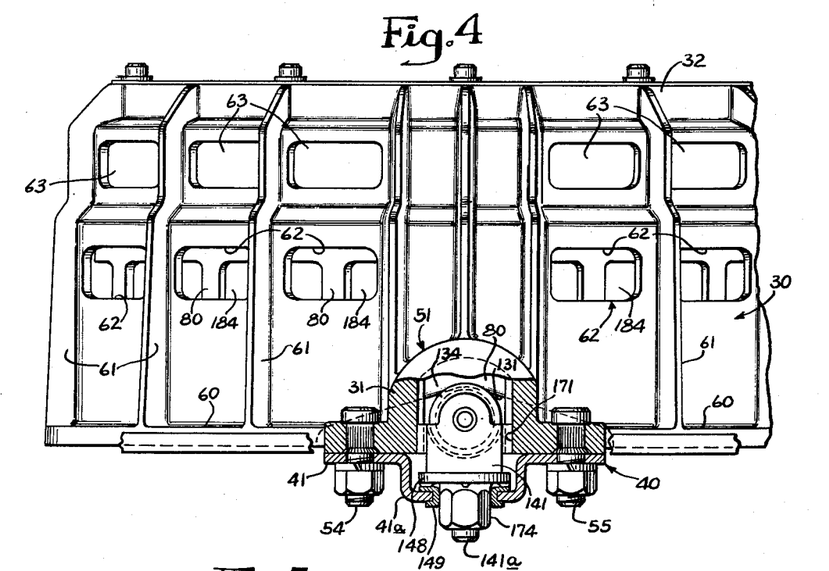
FIG. 4 is a partial section view taken along line 4—4 in FIG. 1.
Figure 5:
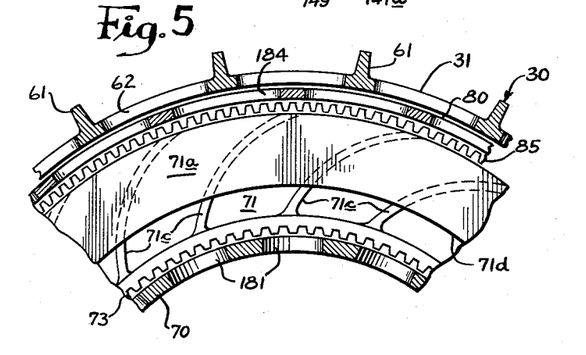
FIG. 5 is a partial section view taken along line 5—5 in FIG. 2.

With further reference to the air flow which is shown by the arrows in FIG. 12, the air which enters the hub is relatively unobstructed being free to pass through the large openings between arms 41–43 constituting the frame. It will be noted that the cool incoming air passes adjacent the cylinder 100 and thus tends to keep down the operating temperature of the hydraulic fluid. The air which is ejected at the periphery of the discs is also relatively unobstructed, passing through the large openings 184 (see FIG. 4) provided in the thrust member and the openings 62, 63 provided in the stationary housing. Since the air passes between the heated disc surfaces, the heat is removed substantially at its source so that there is no objectionable temperature rise even with repeated or prolonged use.

In accordance with one of the more detailed features of the invention a novel shielding arrangement is used for the purpose of directing air along a predetermined path and, at the same time, protecting the friction surfaces against the dirt or other foreign matter which may be carried by the air stream. Thus referring to the discs 71, 72 which are axially movable on the hub, such discs carry overlapping cylindrical vanes 191, 192, respectively, which telescope with respect to one another and which are outside of the air intake openings 71d, 72d. This directs the air into such openings and shields the brake elements which are located between the discs regardless of the position of the discs relative to one another. A pair of annular shields are also provided between the thrust applying member 80 and the inner edge of the housing, such shields being designated 193, 194, respectively. These shields are in close telescoping relation and tend to protect the cam surfaces and the anti-friction bearings on the cam rollers 134—136. A shield 196 of annular form is also provided between the hub and the primary presser plate 82. This shield carries a ring 197 of dry self-lubricating material such as graphite on its inner periphery for engaging an annular land 198 machined at the end of the hub collar. Contact between the shield and the hub is maintained by providing a large diameter coil spring 199 which is of normally conical shape and the outer loop of which is recessed in an annular groove formed on the inside of the primary presser plate 82.

In order to shield the secondary brake disc against the entry of dirt from the outside, the outer end of the stationary housing has a shield 200 of bellows-like construction which carries at its inner end a ring 201 of graphite or the like which in turn bears against an auxiliary flange 202 provided on the hub. The shielding arrangement which has been described is effective to protect all of the critical surfaces including both friction surfaces and bearing surfaces from the direct action of the air, so that long life is assured in spite of the large volumes of air which flow through the brake incident to normal operation. Furthermore, the directed flow reduces noise and windage loss at high vehicle speeds.

Figure 13:
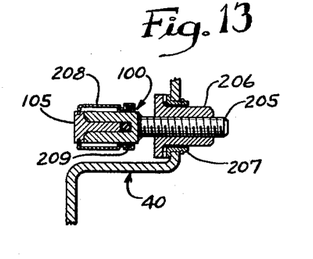
FIG. 13 is a partial view of a take-up arrangement preferably used with the structure shown in the preceding figures.

For the purpose of shielding the cylinder 100 from the entry of dirt, the piston 105 may carry two annular shields 208, as shown in FIG. 13. Each shield carries a ring 209 of graphite or the like which bears in sliding engagement against the sides of the piston 100. This arrangement prevents dirt or dust carried by the directed air flow from interfering with the operation of the piston 100.

The compact nesting of parts afforded by the present design is graphically brought out in the drawings and particularly FIG. 2.

In spite of such compactness, however, brake maintenance is a relatively easy matter. Mention has already been made of the take-up adjusting nuts, accessible externally of the frame. Removal of the wheel including the rim and the pneumatic tire is accomplished in the usual way simply by removing the nuts 19. When the wheel has been thus removed, the housing 30 serves to provide full protection to the working parts of the brake.

Should it become necessary to disassemble the brake mechanism, this can be accomplished by unhooking the retraction springs 144—146 and by unscrewing the nuts threaded on studs 54 and 55 which secure the housing 39 to the arms of the frame 40. The removed mechanism is available as a unit for independent servicing and a similar unit may be substituted so that the vehicle need not be taken out of service for any length of time.

The features and advantages of the above described brake wheel, for the most part, will be apparent to one skilled in the art, having read the foregoing description. It is one of the primary operational features of the brake that it avoids the disadvantages which characterize brakes of the usual "self-energized" type. Self-energized brakes are subject to "gripping" at the friction surfaces and are extremely sensitive to such extraneous factors as temperature and small amounts of foreign matter such as water or grease as a result of which the action over a period of time is largely unpredictable. Furthermore, usual types of self-energized brakes are limited to a boost rate on the order of 2:1 so that half of the total braking effort must be provided directly by the operator. In comparing the present construction with self-energized brakes, it is to be noted that the movement of the thrust member 80 which applies braking thrust to the secondary brake disc is substantially independent of the movement of the operating levers 91–93 and the primary presser plate 82 which applies the braking force to the primary brake disc. The significance of this is that the primary brake disc may be completely released simply by releasing the brake treadle in the vehicle under the most severe braking conditions for, regardless of the amount of thrust being exerted by the thrust member 80, once the primary brake disc has been released any peripheral dragging force upon the thrust member 80 is also released so that the thrust member is free to return to its idle position under the urge of the retraction springs 144—146 and with reversibility of movement insured by the anti-friction bearings. The overall effect of the above is that the force exerted by the primary and secondary brakes acting together is at all times proportional to the force being exerted by the operator upon the brake treadle. As the thrust member 80 is cammed to the left to apply the major braking force the manually controlled piston 105 must follow in order to maintain the pressure causing the camming action. This necessity for manually following up the movement of the thrust member makes it impossible for a "runaway" condition to develop in which the brakes "take over" control from the operator.

It has been found in connection with the above construction that complete and immediate release of the secondary brake disc is obtained even where shallow angles are employed at the cam surfaces 131—133. In brakes such surfaces may have shallow angles on the order of 25° or less. Since the available boost ratio is proportional to the shallowness of the angle, boost ratios may be obtained on the order of 5 or 6 or even higher.

The high boost ratio obtainable with the present brake enables the brake to be controlled either by a direct hydraulic or mechanical linkage without any prior brake mechanism of the servo type and such brake control can be accomplished even though the treadle is restricted to about three inches of travel and even though the force required on the part of the operator is limited to 100 lbs.

The advantages of such direct control are rather apparent. The expense of power braking of auxiliary servo mechanisms is avoided together with lining problems associated therewith. Further, safety is substantially increased since there is no possibility of failure of any auxiliary power mechanism. In present day power brakes, of the conventional type, failure of the power source may require the operator to apply (through the direct feed-through) pressures as high as 200 lbs. or more in order to brake an automobile proceeding at high speed, such pressures being beyond the capacity of women drivers.

It has been noted that a brake constructed according to the invention presents a "soft" pedal "feel" to the operator. Many brake constructions utilizing an additional power source exhibit a "hard" pedal characteristic; that is, the brake pedal feels solid and does not "give" when the operator applies the brake. In these cases the braking force is proportional to the force applied to the pedal and any pedal movement is slight and of no direct importance. This makes smooth braking difficult as each variation in foot pressure instantly applies a different braking force. In a "soft" pedal brake, not only must the foot force be increased but the pedal must be moved forward to apply the brake. Momentary variations in foot pressure that pass too quickly to cause pedal movement have no effect on the braking force applied.

The present arrangement is a "soft" pedal brake for two main reasons. First, the input arms 91c–93c of the levers 91–93 are longer than the force applying arms 91b–93b and, therefore, they must be manually moved a greater distance before a braking force is applied. This initial movement is opposed only by the retraction springs 144—146 and, therefore, there is little pedal resistance. Secondly, when the brake is applied any increase in braking force results only if thrust member 80 moves slightly father to the left in FIG. 10 and if levers 91–93 are rotated slightly more, and each of these movements requires the piston 105 to follow up and be manually moved to the left in FIG. 10. Thus, it can be seen that the braking force is a function of pedal movement as well as pedal force, resulting in more accurate operator control.

The present arrangement also tends to "fight a skid" since a skid, whether on wet or dry pavement, can be brought about only by applying to the wheels a greater braking force than the frictional force existing between the wheels and the pavement. Due to the high boost ratio in the brake most of the braking force is derived from the rotating wheels and normal treadle pressures will not produce sufficient manual force on the brake discs to cause a skid. When the wheels skid or slip on the pavement this source of power is lost and the braking force is relaxed allowing the wheels to rotate and thus tending to stop the skid. Hence, the brakes automatically apply the maximum braking effort possible in a given situation without skidding the wheels.

An important feature of the invention is the instant relaxation of the braking force whether resulting from a loss of booster power when the wheel skids as discussed above, or from the operator easing his foot from the operating treadle. The brake is completely reversible in that it moves into and out of braking engagement with equal ease. There is never a tendency to jam or lock, but rather the brake is always completely responsive to manual control and to the supply of booster power from the rotating wheel. This complete reversibility is achieved by providing a friction reducing roller wherever there is relative movement of the brake force applying members. That is, the thrust applying member 80 applies force to the secondary brake disc 72 through rollers 160 and the member 80 is cammed forward by riding on rollers 134. Also the piston 105 exerts force on the levers 91–93 through rollers 91d–93d. Therefore, it can be seen that rollers 160, 134 and 91d–93d permit the booster brake applying assembly to freely rotate into and out of braking engagement. There are no heavily loaded sliding engagements between the various parts to stick and delay release of the brake.

Where it is desired, under unusual circumstances, to employ a power servo with the present brake, this may be done without any change in the brake structure except that the cam angle will normally be increased to reduce the boost ratio of the mechanism. Regardless of the cam angle, the cam is preferably made symmetrical so that the braking effect is the same regardless of the direction of rotation of the wheel. In the embodiment set forth in the drawings, the brake has been applied to the front wheel of an automobile. The brake is equally applicable to the rear wheels, the only difference being that the spindle is replaced by the rear axle and is thus rotatable with respect to the frame and the brake with a direct connection between the axle and the wheel hub. Regardless of whether the brakes are used at the front wheels or at the back, even a slight roll of the vehicle is effective to bring the brakes into an effective operation.

Since, in the present construction, most of the braking effect is accomplished by the secondary brake disc, the brake linings associated with said disc will normally tend to wear out sooner than the brake linings associated with the primary disc. Thus a slightly higher pedal force may be necessary to accomplish the same braking effect when the secondary brake linings are worn. This is however, considered a safety feature since it signals to the operator the need for replacement of linings at a time when adequate brake lining is still available at the primary brake surfaces.

In the following claims, the term "treadle" is used for the sake of convenience and it should be broadly interpreted to include any brake operator performing the function normally associated wtih a treadle, regardless of whether such operator includes an auxiliary servo-mechanism.

Also in the following claims, the term "spindle" is used for the sake of clarity and convenience and it should be considered to mean both a non-rotatable steering spindle as found supporting the front wheels of an ordinary automobile as well as a rotatable axle which ordinarily supports the rear wheels of an automobile.

I claim as my invention:

1. In a mechanical booster brake for use in a vehicle having a brake operator, the combination comprising a frame having means for attachment to the vehicle and providing a spindle, a hub on said spindle and having primary and secondary brake members, means including primary and secondary friction members for respective engagement of the brake members, means including a brake actuator adapted for connection to said brake operator for causing progressive engagement of the primary brake and friction members to provide an initial braking action, said primary friction member being mounted for limited peripheral movement with respect to said frame, coupling means including a thrust applying member coupled to said primary friction member and connected to said secondary friction member for producing progressive engagement between said secondary brake and friction members in response to peripheral movement of said primary friction member, said thrust applying member having a thrust, but not a rotational, connection with said secondary friction member to permit immediate release of the engagement between said secondary members incident to release of engagement between said primary members.

2. In a mechanical booster brake for use on a vehicle having a brake operator, the combination comprising a frame having means for attachment to the vehicle and providing a spindle, a hub on said spindle and having primary and secondary disc members mounted thereon and axially spaced from one another so as to have opposed inner surfaces and oppositely facing outer surfaces, a cylindrical housing secured to said frame and having an inwardly extending flange providing a friction surface for engaging the outer surface of the secondary disc, a cylindrical thrust applying member telescoped in said stationary housing and having an inwardly extending flange for engaging the outer surface of said primary disc, primary and secondary presser plates for engaging the inner surfaces of said discs respectively with said secondary presser plate being splined to said stationary housing and said primary presser plate being splined to said thrust applying member, means including an actuator for pressing said primary presser plate into engagement with said primary disc to produce a peripheral drag on said thrust applying member, means including a reversible cam coupled to said frame for causing the thrust applying member to be cammed endwise incident to said peripheral drag, and anti-friction means between said thrust applying member and the secondary presser plate for transmitting axial braking force to the latter in response to said endwise movement, said actuator being so constructed as to permit release of said primary presser plate upon release of said brake operator independent of the position of the thrust applying member.

3. In a mechanical booster brake for use on a vehicle having a brake operator, the combination comprising a frame having means for attachment to the vehicle and providing a spindle, a hub on said spindle and having primary and secondary disc members mounted thereon and axially spaced from one another so as to have opposed inner surfaces and oppositely facing outer surfaces, a cylindrical housing secured to said frame and having an inwardly extending flange providing a friction surface for engaging the outer surface of the secondary disc, a cylindrical thrust applying member telescoped in said stationary housing for limited peripheral movement and having an inwardly extending flange for engaging the inner surface of said primary disc, primary and secondary presser plates for engaging the inner surfaces of said discs respectively with said secondary presser plate being splined to said stationary housing and said primary presser plate being splined to said thrust applying member, means for pressing said primary presser plate into engagement with said primary disc in response to movement of the brake operator to produce a perpiheral drag on said thrust applying member with resulting peripheral movement, reversible means for causing the thrust applying member to be urged endwise incident to said peripheral movement, and anti-friction means between said thrust applying member and the secondary presser plate for transmitting axial braking force to the latter in response to said endwise movement.

4. In a mechanical booster brake for use on a vehicle having a brake operator, the combination comprising a frame having means for attachment to the vehicle and providing a spindle, a hub on said spindle and having primary and secondary disc members mounted thereon and axially spaced from one another so as to have opposed inner surfaces and oppositely facing outer surfaces, a cylindrical housing secured to said frame and having an inwardly extending flange providing a friction surface for engaging the inner surface of the secondary disc, a cylindrical thrust applying member telescoped in said stationary housing for limited peripheral movement and having an inwardly extending flange for engaging the inner surface of said primary disc, primary and secondary presser plates for engaging the inner surfaces of said discs respectively, with said secondary presser plate being splined to said stationary housing and said primary presser plate being splined to said thrust applying member, means including a lever coupled to said brake operator and arranged to squeeze said primary presser plate and said thrust applying member inwardly toward said primary disc member to produce a peripheral drag on said thrust applying member, means including a reversible cam coupled to said frame for causing the thrust applying member to be cammed endwise in response to said drag, and anti-friction means between said thrust applying member and the secondary presser plate for transmitting axial braking thrust to the latter in response to said endwise movement.

5. In a mechanical booster brake for use in a vehicle having a treadle, the combination comprising a frame having means for attachment to the vehicle and providing a spindle, a hub on said spindle and having primary and secondary brake discs, a pair of primary friction members for engaging the respective faces of said primary brake disc, means including a brake actuator adapted for connection to said treadle for progressive engagement of the primary members to provide an initial braking action, said primary friction members being mounted for limited peripheral movement with respect to said frame, secondary friction members peripherally restrained with respect to said frame for engaging said secondary brake disc, a thrust applying member having a reversible camming engagement with said frame and so arranged as to apply braking thrust against the secondary friction members in response to the peripheral movement of said primary friction members which occurs when the latter are engaged with the primary brake disc, said brake actuator means being arranged to produce relative movement between said pair of primary friction members for gripping and release of said primary brake disc in spite of changes in position of the members relative to the frame.

6. In a mechanical booster brake for use in vehicle having a treadle, the combination comprising a frame having means for attachment to the vehicle and providing a spindle, a hub on said spindle and having primary and secondary brake discs, a pair of primary friction members for engaging the respective faces of said primary brake disc, means including a brake actuator adapted for connection to said treadle for progress engagement of the primary members to provide an initial braking action, said primary friction members being mounted for limited peripheral movement with respect to said frame, secondary friction members peripherally restrained with respect to said frame for engaging said secondary brake disc, means including a thrust applying member providing a reversible camming engagement relative to said frame so that braking thrust is applied against the secondary friction members in response to the peripheral movement of said primary friction members which occurs when the latter are engaged with the primary brake disc, said brake actuator being mounted solely on said pair of primary friction members to provide relative movement therebetween for gripping and release of said primary brake disc independently of changes in position of such members relative to the frame.

7. In a mechanical booster brake for use in a vehicle having a treadle, the combination comprising a frame having means for attachment to the vehicle and providing a spindle, a hub on said spindle and having primary and secondary brake discs, a pair of primary friction members for engaging the respective faces of said primary brake disc, means including a brake actuator connected to said treadle and coupled to said primary friction member for progressive engagement of the primary members to provide an initial braking action, said primary friction members being mounted for limited peripheral movement with respect to said frame, secondary friction members peripherally restrained with respect to said frame for engaging said secondary brake disc, a cylindrical thrust applying member interposed between the frame and the secondary friction members, said thrust applying member being rotatively coupled to said primary friction members and having anti-friction means including a peripherally spaced set of reversible cams to urge the member endwise upon peripheral movement thereof so that braking thrust is applied against the secondary friction members in response to the peripheral movement of said primary friction members which occurs when the latter are engaged with the primary brake disc, said brake actuator means being arranged to produce relative movement between said pair of primary friction members for gripping and release of said primary brake disc in spite of peripheral movement of the members.

8. In a mechanical booster brake for use in a vehicle having a brake operator, the combination comprising a frame having means for attachment to the vehicle and providing a spindle, a hub on said spindle having primary and secondary brake discs axially spaced thereon, a cylindrical housing surrounding said discs, said housing being secured to the frame at one end and having an inwardly extending flange at the other end providing an annular braking surface for engaging the presented face of the secondary brake disc, a cylindrical thrust applying member telescoped within said housing and having provision for limited axial and peripheral movement, said thrust applying member having means at one end for applying braking thrust against the remaining face of said secondary brake disc and having a helical surface formed at the other end, a roller adjustably mounted in said frame for engaging said helical surface and provided with anti-friction bearings, primary friction members for engaging said primary brake disc and arranged for operation by the brake operator on the vehicle, said primary friction members being coupled to said cylindrical thrust applying member so that the dragging force transmitted to the latter incident to applying the brake operator causes said thrust applying member to ride on said roller along a helical path of movement thereby to apply braking thrust to said secondary brake disc.

9. In a mechanical booster brake for use in a vehicle having a brake operator, the combination comprising a frame having means for attachment to the vehicle and providing a spindle, a hub on said spindle having primary and secondary brake discs axially spaced thereon, secondary friction members for cooperating with the secondary brake disc, a cylindrical thrust applying member having provision for limited axial and peripheral movement relative to said frame, said thrust applying member having means at one end for transmitting braking thrust to the secondary friction members and having a set of helical surfaces at the other end, a set of rollers on said frame for engaging said helical surfaces respectively, primary friction members for engaging said primary brake disc and arranged for operation by the brake operator on the vehicle, said friction members being coupled to said cylindrical thrust applying member so that the dragging force transmitted to the latter incident to engagement of the primary brake disc causes said thrust applying member to ride on said rollers along a helical path of movement thereby to apply braking thrust to said secondary brake disc, said rollers having anti-friction bearings and the slope of the helical surfaces being such as to cause reverse movement of the thrust member immediately upon release by said brake operator of said primary brake disc.

10. In a mechanical booster brake for use in a vehicle having a brake operator, the combination comprising a frame having means for attachment to the vehicle and providing a spindle, a hub on said spindle having primary and secondary brake discs axially spaced thereon, secondary friction members for cooperating with the secondary brake disc, a cylindrical thrust applying member having provision for limited axial and peripheral movement, said thrust applying member having means at one end for transmitting braking thrust to said secondary friction members and having a set of helical surfaces formed at the other end, a set of rollers mounted in said frame for engaging said helical surfaces respectively and provided with anti-friction bearings, primary friction members for engaging said primary brake disc and arranged for operation by the brake operator on the vehicle, said friction members being coupled to said cylindrical thrust applying member so that the dragging force transmitted to the latter incident to engagement of the primary brake disc causes said thrust applying member to ride on said rollers along a helical path of movement thereby to apply braking thrust to said secondary brake disc, said rollers having provision for individual axial adjustment.

11. In a mechanical booster brake for use in a vehicle having a brake operator, the combination comprising a frame having means for attachment to the vehicle and providing a spindle, a hub on said spindle having primary and secondary brake discs, a cylindrical thrust applying member surrounding said primary brake disc and having an inwardly extending flange providing an annular friction surface presented to one of the faces on said primary brake disc, an annular presser plate having a friction surface presented to the remaining face of said brake disc and having a splined connection with respect to the thrust applying member, said thrust applying member having a reversible camming engagement with said frame permitting limited peripheral movement thereof so that such movement resulting from engagement of the primary braking surfaces is combined with an axial component of movement, means coupled to said thrust applying member and responsive to the axial component of movement thereof for frictionally engaging said secondary brake disc, a plurality of radially extending levers engaging said thrust member and said primary presser plate and so arranged that upon applying axial force to the inner ends thereof the primary brake disc is pinched between the friction surfaces on said thrust member and said primary presser plate respectively, and means arranged for coupling to the brake operator on said vehicle for applying braking force simultaneously to the inner ends of said levers.

12. In a mechanical booster brake for use in a vehicle having a brake operator, the combination comprising a frame having means for attachment to the vehicle and providing a spindle, a hub on said spindle having primary and secondary brake discs, a cylindrical thrust applying member surrounding said primary brake disc, first and secondary primary friction members for engaging the faces of said primary disc, said primary friction members being coupled to the thrust applying member and so mounted as to urge the latter peripherally in response to the frictional drag of the primary brake disc, anti-friction means mounting the thrust applying member for movement in a helical path, means coupled to said thrust applying member and responsive to the axial component of movement thereof for frictionally engaging said secondary brake disc, a plurality of symmetrically arranged levers engaging the primary friction members for squeezing the same inwardly upon said primary brake disc, an axially movable ring member coupled to the brake operator on the vehicle for engaging and operating all of said levers simultaneously, and friction reducing means interposed between said ring member and each of said levers.

13. In a mechanical friction brake for a rotatable hub journaled on a frame the combination comprising a friction member carried for rotation with said hub, means mounted on said frame for limited peripheral rotation about said hub including a braking member engageable with said friction member, at least one lever carried by said means and being coupled to said braking member and movable axially of said hub to urge the braking member into engagement with the friction member, an annular actuating piston surrounding said hub and positioned to engage the lever at any angular position of said lever about the hub, and a roller carried by the lever at the point of lever-piston engagement so that the roller may ride around the annular piston when the piston is in engagement with the lever and limited peripheral rotation of the means carrying the lever occurs.

References Cited in the file of this patent

UNITED STATES PATENTS

| | | |
|---|---|---|
| 1,629,532 | Renaux | May 24, 1927 |
| 2,078,466 | Stauffer et al. | Apr. 27, 1937 |
| 2,097,873 | Evans | Nov. 2, 1937 |
| 2,105,867 | Stewart | Jan. 18, 1938 |
| 2,142,174 | Burrow | Jan. 3, 1939 |
| 2,207,431 | Burns | July 9, 1940 |
| 2,254,998 | Gates | Sept. 2, 1941 |
| 2,262,709 | Lambert | Nov. 11, 1941 |
| 2,263,945 | Eksergian | Nov. 25, 1941 |
| 2,280,355 | Spase et al. | Apr. 21, 1942 |
| 2,344,933 | Lambert | Mar. 21, 1944 |
| 2,369,320 | Sneed | Feb. 13, 1945 |
| 2,375,855 | Lambert | May 15, 1945 |
| 2,549,217 | Mason | Apr. 17, 1951 |
| 2,559,885 | Loweke | July 10, 1951 |
| 2,642,959 | Freer | June 23, 1953 |
| 2,655,236 | Bachman | Oct. 13, 1953 |
| 2,655,237 | Benson | Oct. 13, 1953 |
| 2,778,451 | Friedman | Jan. 22, 1957 |

FOREIGN PATENTS

| | | |
|---|---|---|
| 690,251 | France | Sept. 18, 1930 |
| 543,905 | Great Britain | Mar. 18, 1942 |